Figure 3:
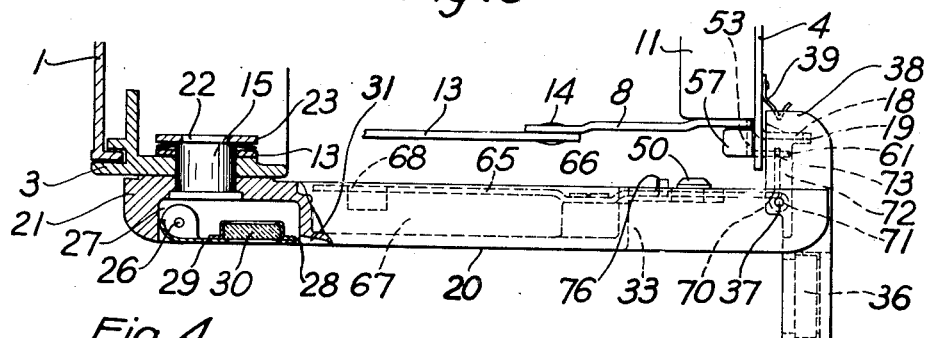

March 12, 1940.  J. CHRISTIE  2,193,019
FOLDING CAMERA
Filed May 11, 1938  2 Sheets-Sheet 1
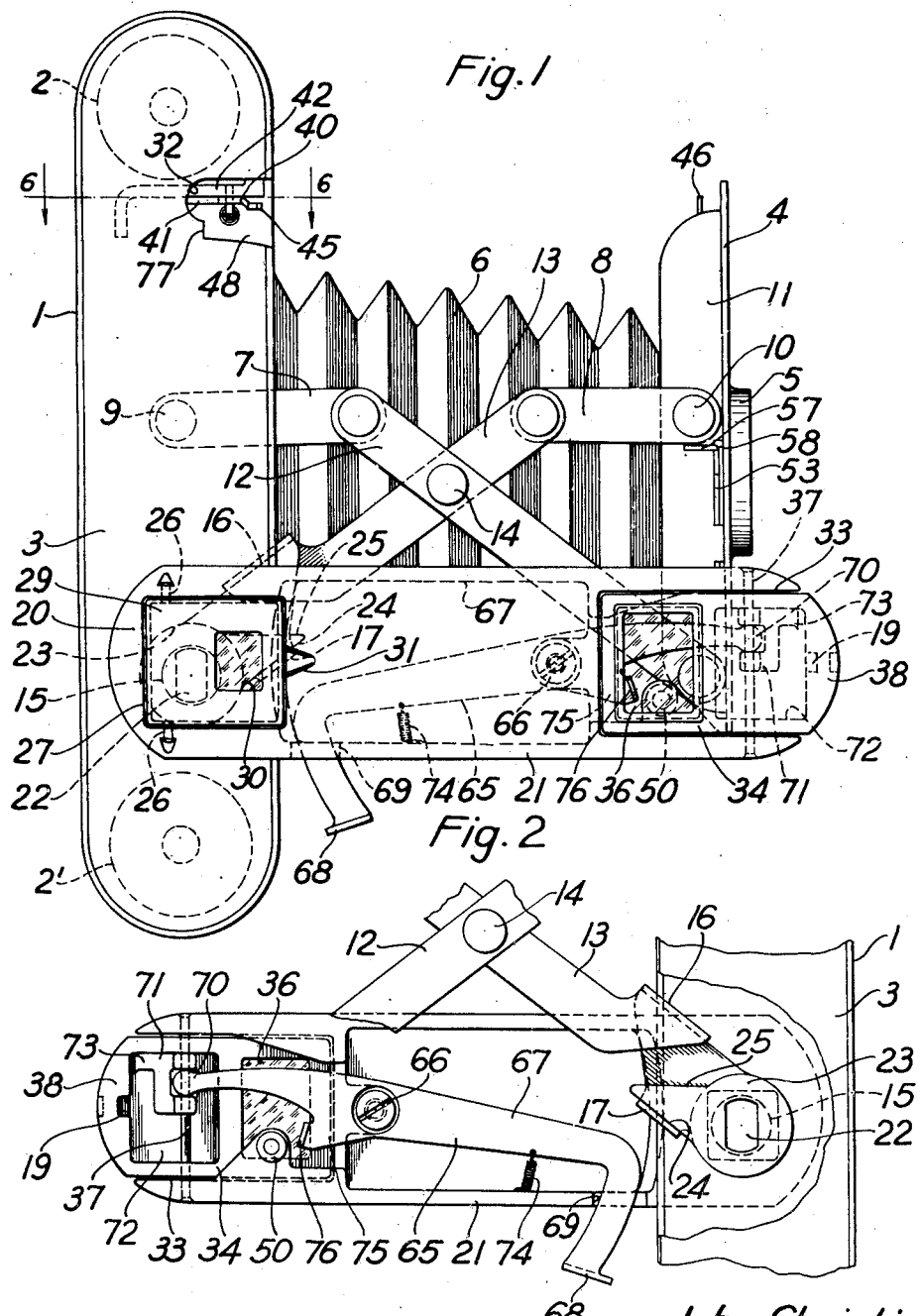
John Christie
INVENTOR March 12, 1940.  J. CHRISTIE  2,193,019
FOLDING CAMERA
Filed May 11, 1938  2 Sheets-Sheet 2

John Christie
INVENTOR
BY
ATTORNEYS

Patented Mar. 12, 1940

2,193,019

UNITED STATES PATENT OFFICE 2,193,019

FOLDING CAMERA

John Christie, Rochester, N. Y., assignor to Eastman Kodak Company, Rochester, N. Y., a corporation of New Jersey Application May 11, 1938, Serial No. 207,346

19 Claims. (Cl. 95—39)

The present invention relates broadly to photography, and particularly to a folding camera including a view finder which is movably mounted on the camera body to move between an operative viewing position and an inoperative folded position relative to said camera body.

One object of the present invention is the provision with a folding camera of a view finder movably mounted on the camera body to move between an operative viewing position and an inoperative folded position relative to said camera body, said view finder being connected to the lens board erecting mechanism so that the lens board is automatically moved to and from its extended position when the view finder is moved to and from its viewing position, respectively. Another object is the provision in a camera of the type described of a latch for holding the lens board and the view finder in their respective inoperative or folded positions. And another object is the provision of a latch for the purpose described which is adapted to be released by the first part of the movement of the view finder toward its viewing position so that the lens board is released to be moved to its extended position by the view finder in the remainder of its movement to its viewing position. And yet another object of the present invention is the provision of a camera of the type described wherein the view finder comprises an elongated base member, one end of which is pivoted to one side wall of the camera body so that in its inoperative position the view finder extends longitudinally of the camera body, while in its operative position it extends perpendicular to the camera body with its free end adjacent to lens board. And still another object is the provision of a shutter release mechanism mounted on the view finder which is adapted to be operatively connected to the shutter trigger when the view finder is moved to its operative position. A further object is the provision of a shutter release mechanism of the type described which is mounted in a recess in the under side of the base member of the view finder, and arranged so as to be automatically retracted within said recess when the view finder is moved to its inoperative position. And another object is the provision of a shutter release mechanism of the type described which is so arranged that the operating member thereof lies adjacent the camera body when the view finder is in its operative position, whereby the shutter can be conveniently tripped by a finger on one of the hands holding the camera without necessitating the release of camera by said hand. And still another object is the provision of a camera of the type described wherein the parts are so arranged as to provide a compact unit when the camera is folded to its carrying position, and one in which all of the parts are adapted to be automatically moved to their operative picture-taking positions or folded positions by the movement of a view finder between its operative and folded positions.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which:

Fig. 1 is a side elevation of a folding camera according to the present invention, and showing the camera in its extended picture-taking position, but with the finder elements in their collapsed position relative to the view finder base, Fig. 2 is an elevation of the view finder looking at it from the under side, and showing particularly the connection between the view finder and the lens board erecting mechanism, as well as the arrangement of the shutter release mechanism in a recess in the under side of the base member of the view finder.

Figure 4:
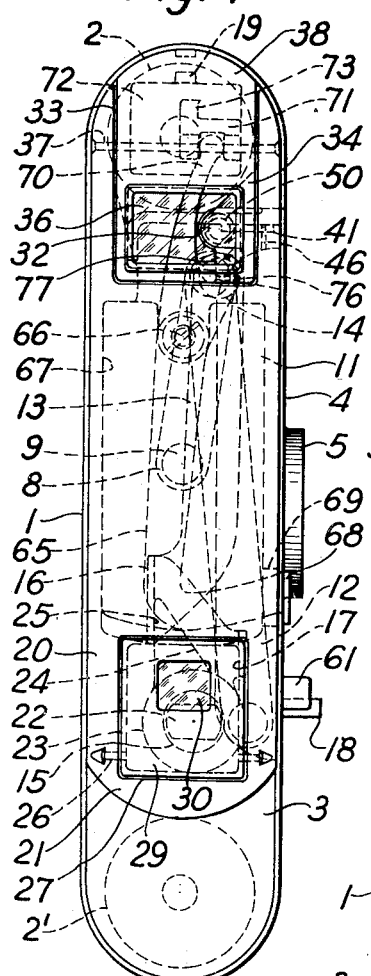
Figure 5:
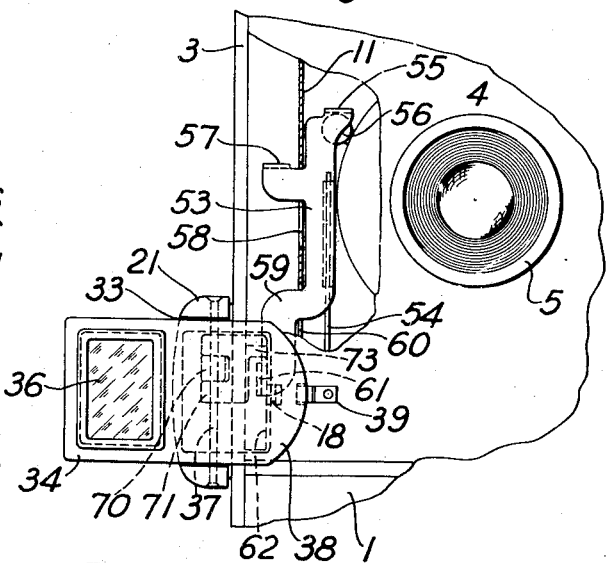
Figure 6:
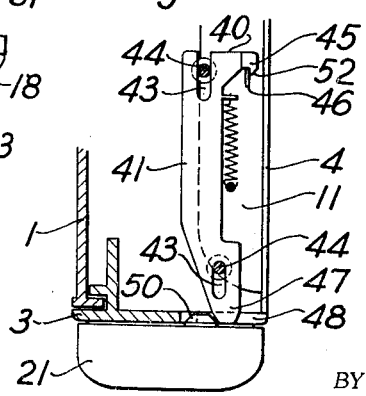

Fig. 3 is a plan view of the view finder, partly in section, and showing its relation to the camera body and the lens board when the camera is in its extended picture-taking position, Fig. 4 is a side elevation of the camera in its folded position, and showing the relative position of the parts when the camera is folded to its carrying position, Fig. 5 is a partial front elevation of the camera, and showing the manner in which the shutter release mechanism carried by the view finder is operatively connected to the shutter trigger when the parts are moved to their operative picture-taking positions, and Fig. 6 is a section taken substantially on line 6—6 of Fig. 1, and showing the latch for holding the lens board and the view finder in their respective folded positions.

Like reference characters refer to corresponding parts throughout the drawings.

Although for the purpose of illustration I have chosen to show my novel arrangement in connection with a folding camera of the type wherein the lens board in moving to and from its extended and folded positions is maintained parallel to the camera body, and when in its folded position forms the front wall of the camera body; it is pointed out that the arrangement is not limited to use with a camera of this type but could be adapted to any folding camera such as for example, one in which the lens board is foldably mounted on a bed to be folded completely within the camera body while the bed serves as a door for the camera body, without going beyond the scope of the present invention. Therefore, when reading the following specification it is to be kept in mind that the particular form of the parts and the arrangement thereof in the specific embodiment disclosed are adapted particularly for use with the particular form of folding camera shown, but that the inventive idea could be carried out with folding cameras of other types by altering the form and arrangement of the parts without going beyond the scope of the present invention.

Referring now to the drawings wherein a specific embodiment of the invention is shown, the folding camera in conjunction with which I have chosen to show my novel arrangement comprises a body member 1 in the ends of which the takeup and supply spools of film 2 and 2' respectively are mounted in the conventional manner. The front wall of the camera body 1 is provided with a rectangular opening, not shown, but as well known in the art, and said opening is adapted to receive and be closed by the rectangular lens board 4 when the same is moved to its folded position, see Fig. 4. The lens board 4 may include a built-in lens and shutter unit, indicated generally as 5, as is well known in the art, and the usual bellows 6 is provided between the lens board and the interior of the camera body.

The lens board may be foldably connected to the camera body 1 by any suitable form of erecting mechanism, and for the purpose of illustration I have shown such an erecting mechanism which permits of the lens board in moving to and from the folded position maintaining a parallel relation with the front wall of the camera body at all times during its movement, such an arrangement being characteristic of folding cameras of the type shown. This erecting mechanism takes the form of a lazy tong lever system including levers 7 and 8, one end of the former being pivoted at 9 to the inside of the side wall 3 of the camera body, and one end of the latter being pivoted at 10 to the side of the casing 11 attached to the rear of the lens board 4 and housing the lens and shutter unit. The free ends of these levers 7 and 8 are pivoted to the ends of cross levers 12 and 13 which are pivoted intermediate their ends at 14. The lever 12 is pivoted to the lower end of the casing 11 while the other end of lever 13 extends into the camera body and is loosely pivoted on a trunnion 15 which extends through and is rotatably mounted with respect to the side wall 3 of the camera body. The end of the lever 13 pivoted to the side wall of the camera is specially formed so as to be provided with spaced upturned abutments 16 and 17, the purpose of which will be hereinafter fully described. It will be understood by those skilled in the art that an erecting mechanism such as that described will be needed on both sides of the camera bellows, but it is pointed out that the end of the other lever corresponding to lever 13 described need have no special end adjacent its pivot point on the side wall of the camera body, but that said pivot point need only be a fixed stud instead of a special trunnion 15 described as the pivot point of the lever 13. With this type of lens board erecting mechanism, it will be readily understood that when the lever 13 is moved about the trunnion 15 in the camera body the erecting mechanism will be either folded to a position shown in Fig. 4 within the camera body, or extended therefrom, to a position as shown in Fig. 1, depending of course upon the direction of movement of said lever 13.

Fixed at one end to the trunnion 15 to rotate therewith is a view finder, indicated generally as 20, which comprises an elongated base member 21 the width and length of which are such that when moved to its folded position relative to the camera body as shown in Fig. 4, the view finder will be within the confines of the side walls to present a neat appearance. The trunnion 15 is made relatively large to give a strong and steady bearing portion for the view finder, and to the reduced inner end 22 of the trunnion 15 there is fixed a pointed member 23 which extends between the abutments 16 and 17 on the end of the lever 13. The engaging edges 24 and 25 of the pointed member 23 are cut at such an angle that when the view finder is moved to its operative position, see Fig. 1, the edge 24 thereof squarely engages the abutment 17 to move the lever 13 in the proper direction to extend the erecting mechanism, or when the view finder is moved in its opposite direction the edge 25 of the pointed member 23 engages the abutment 16 to move the lever 13 in the direction to collapse the erecting mechanism. Thus, through this connection it will be appreciated that when the view finder is moved to its viewing position, see Fig. 1, from its folding position, see Fig. 4, the trunnion 15 and along with it the pointed member 23 will be rotated to erect the erecting mechanism whereby the lens board will be moved to its picture-taking position. In the same manner, as the view finder is moved to its folded position the pointed member 23 will cause a collapse of the erecting mechanism and the lens board will be moved to its folded position within the camera body.

Pivotally mounted at 26 in the recess 27 at the rear end of the base member 21 is the rear finder element 28 which may include an apertured metal frame 29 in which is located the usual optical member 30. This finder element when folded into the recess 27 is adapted to be flush with the top of the base member, see Fig. 3, and when in its operative position is raised to a vertical position relative to the base member 21. This rear finder element can be normally forced to its vertical operative position by means of a spring which is released when the view finder is moved to its viewing position, but for the purpose of illustration I have shown the edge of the recess 27 cut away at 31 so that the finder element can be gripped by the fingernail to be raised by hand.

Referring to Fig. 1 it will be noticed that the base member 21 is of such a length that when the view finder is moved to its viewing position the free end of the base member extends substantially beyond the lens board 4. The free end of the base member 21 is provided with a recess 33 in which the front finder element is pivotally mounted to move between a folded position wherein it is flush with the surface of the base member, and a vertical position wherein it is in alignment with the rear finder element for viewing purposes. This front finder element includes a substantially rectangular member 34 the upper end of which is provided with an aperture in which is mounted the optical finder element 36 which aligns with the optical element 30 of the rear finder element to provide a direct view finder. The front finder element 34 is pivotally mounted on a pin 37 which extends across the free end of the base member 21, and said pin is located in front of the lens board 4 so that when the finder elment is raised to its vertical position the lower end 38 thereof in front of the pin will extend a substantial distance over the face of the lens board, see Figs. 3 and 5. It will be understood that to permit the finder element to assume this vertical position, that portion of the base member from a point just behind the pivot pin 37 to the free end thereof must be entirely cut away. The front finder element 34 can be raised to its vertical viewing position by pressing downwardly upon the lower end 38 thereof, and it is held in its vertical position when the spring catch 39 fixed to the front face of the lens board 4 snaps into a notch provided in the lower edge of the element, see Fig. 3. This spring catch 39 in addition to serving to hold the front finder element in its vertical position, also serves to position the view finder relative to the lens board and to steady the free forward end thereof. The view finder is further supported in its extended or viewing position by having a portion 18 of the lens board 4 turned out at right angles to the face of the lens board to extend into a recess 19 in the under side of the lower end 38 of the front view finder element, see Figs. 3 and 5.

Referring now particularly to Figs. 1, 4, and 6, a spring catch, indicated generally as 40, is mounted within the recess in the camera body 1 to hold the lens board 4 and view finder in their respective folded positions relative to the camera body. This spring catch includes a slide 41 which is slidably mounted to the top wall 42 of the recess in the camera body by having slots 43 therein engaging headed studs 44 fixed to the wall of the recess. This slide includes a hook 45 which is adapted to engage and hold a lug 46 projecting from the top of the casing 11 to hold the lens board in its folding position. This slide is so located in the camera body that the end 47 thereof extends through the cutout 48 in the side wall 3 of the camera body and into the path of a cam faced stud 50 fixed to the under side of the base member 21 of the view finder, see Figs. 1 and 6. The cam faced stud 50 in the folded position of the view finder is adapted to extend into the cutout 48 in the side wall of the camera body and come to rest in a curved portion 32 thereof, see Fig. 4. While the end 47 of the slide 41 will normally hold the view finder in its folded position, it will be appreciated that due to the cam face of the stud 50 when a little pressure is exerted on the base member 21 the stud will tend to force the slide to its release position. Referring to Figs. 1 and 2, it will be noticed, by referring to the relation of the pointed member 23 relative to the abutments 16 and 17, that in moving from one extreme position to the other there will be a partial movement of the base member 21 which is independent of the erecting mechanism. This is due to the fact that the pointed member 23 must move through a certain arc before it engages the abutment opposite to the one which it is in engagement with when the finder is in one of its extreme positions. Due to this independent movement therefore, when the parts are in their folded positions, the first part of the movement of the view finder toward its viewing position will be independent of the erecting mechanism and will serve to allow the cam faced stud 50 to move the slide 41 to its release position. Just as this release occurs, the pointed member 23 will pick up the abutment 17 and move the erecting mechanism and the lens board to their extended positions. Likewise the relationship of the view finder and the lens board in moving to their folded positions may be such that the cam faced stud 50 engages and moves the slide to its released position just as the lug 46 on the casing 11 approaches the same, after which the stud moves by the slide 41 and allows the same to return it to its locking position whereby the hook 45 engages the lug 46, see Fig. 6. The face of the hook 45 may be inclined as shown at 52 so that the lug 46 would itself cam the slide 41 to its release position should the relationship between the view finder and the lens board in moving to their folded positions fail to move the slide to its release position at the proper time.

In order to permit a release of the shutter without necessitating the removal of either hand holding the camera directed toward an object determined by the view finder, the following shutter release mechanism is provided. The usual shutter trigger for folding cameras of this type includes a trigger 53 which is slidably mounted within the casing 11 as on a post 54, said trigger having a flanged end 55 engaging the release member 56 of the shutter, and a fingerpiece 57 extending through a slot 58 in the side of the casing 11 behind the lens board 4. With such an arrangement the tripping of the shutter is accomplished by pressing downwardly on the finger-piece 57, the inherent spring action of the shutter serving to return the shutter trigger to its normal position when the shutter is released. For use in conjunction with my novel shutter release mechanism I have modified this usual shutter trigger, as shown in Fig. 5, by increasing its length and providing the lower end thereof with a double offset, one portion 59 of which extends through a slot 60 in the casing 11, while the other portion or end 61 extends through a slot 62 in the lens board 4 to extend beyond the front thereof.

My novel shutter release mechanism comprises a release lever 65 pivoted at 66 in a recess 67 in the under side of the base member 21 of the view finder. One end 68 of this release lever extends through an opening 69 in the side of the base member adjacent the side wall 3 of the camera body and near one end thereof so that a finger on one hand holding the camera can actuate the lever without necessitating the removal of the hand from the camera body. The other end 70 of the release lever 56 overhangs the pivot pin 37 to slide there-along when the lever is moved about its pivot point 66. Since the movement of the end 70 necessary in tripping the shutter trigger is very short there will be no binding set up between the end 70 of the lever 56 and the pivot pin 37 due to the pivotal movement of the lever. In addition it will be noticed that the pivot point 66 is so situated relative to the ends 68 and 70 of the lever 65 that the movement necessary for end 68 is substantially greater than the movement necessary for end 70 in tripping the shutter.

Slidably mounted on the pin 37 is a yoke member 71 the arms of which lie on opposite sides of the end 70 of the release lever 65. The under side of the front finder element 34 may be provided with a recess 72, contiguous with recess 19, but not so deep, in which the yoke member is situated. The yoke member is provided with a finger 73 which when the front finder element is moved to its vertical position relative to the base member overhangs the end 61 of the trigger 53 extending through the slot 62 in the lens board 4, see Fig. 5. The yoke member 71 may be normally spring pressed into engagement with the under side of the base member 21 by a spring, not shown, so that said yoke member will tend to move in conjunction with the front finder element 34 when the same moves between its operative and inoperative position relative to the base member 21. The shutter release lever 65 is normally held in its inoperative position by the coil spring 74 wherein finger 73 on the yoke member is normally held in a position to properly overhang the end 61 of the trigger 53 when the front finder element is raised to its vertical viewing position. By referring to Figs. 2 and 5, it will be obvious how when the release lever 65 is pivoted by pressing on the end 68 thereof the other end 70 thereof will slide the yoke member along the pin 37 to actuate the shutter trigger, it being essential of course that the front view finder element be in its viewing position.

The shutter release lever 65 is also provided with an arm 75 having an upturned end 76 projecting beyond the bottom of the base member 21. When the view finder is moved to its folding position, see Fig. 4, this upturned end 76 is adapted to extend into the cutout 48 in the side wall 3 of the camera body 1 and engage the straight wall 77 thereof. The relationship between the position of the straight wall 77, and the upturned end of the arm 75 is such that, when the view finder is moved into its complete folded position, the shutter release lever 65 is retracted within the recess 67 in the base member 21 against the action of the coil spring 74, in which position it is out of the way and substantially out of sight.

From the above description it will be readily understood that movement of the view finder to and from its operative viewing and folded positions causes a corresponding movement of the lens board to and from its extended and folded positions. In other words the view finder actually acts as a lever for erecting or closing the camera. Also by providing a catch of the type described for holding the lens board and the view finder in their respective folded positions, the release of the lens board is effected automatically in timed relation with and by the movement of the view finder so that the view finder serves to latch and unlatch the lens board in its folded position. Although I have described an erecting mechanism wherein the view finder and lens board must be manually moved to their respective positions, it is to be understood that it is not beyond the scope of the invention to provide spring actuating means for moving the same to their extended positions automatically after they have been unlatched. By mounting the shutter release mechanism on the view finder in the manner described I have provided an arrangement whereby the shutter can be conveniently released by a finger on one hand used to steady the camera, and an arrangement which is compact and out of sight, particularly in the folded position of the camera. While I have chosen to show my novel combination in conjunction with a particular type of folding camera, it is to be understood that the combination could be carried out with any known type of folding camera by merely rearranging the parts without going beyond the scope of the present invention.

Although I have shown and described one embodiment of my invention, I am fully aware that many modifications thereof are possible. My invention therefore is not to be restricted except in so far as is necessitated by the prior art and by the spirit of the appended claims.

Having thus described my invention, what I declare is new and desire to secure by Letters Patent of the United States is:

1. In a folding camera, the combination of a camera body, a lens board, means connecting the lens board with the camera body whereby the lens board is arranged to move between an operative position wherein it is extended to its picture taking position relative to the camera body, and an inoperative position wherein the lens board is folded into the camera body, a view finder movably mounted on the camera body to move between an operative viewing position, and an inoperative folded position, and means for connecting the view finder and the means connecting the lens board to the camera body, whereby movement of the view finder to its operative position automatically moves the lens board to its operative position.

2. In a folding camera, the combination of a camera body, a lens board, means connecting the lens board with the camera body whereby the lens board is arranged to move between an operative position, wherein it is extended to its picture taking position relative to the camera body, and an inoperative position, wherein the lens board is folded into the camera body, a view finder movably mounted on the camera body to move between an operative viewing position, and an inoperative folded position, and means for connecting the view finder and the means connecting the lens board to the camera body, whereby movement of the view finder to its operative position automatically moves the lens board to its operative position, and movement of the view finder to its inoperative position automatically moves the lens board to its inoperative position.

3. In a folding camera, the combination of a camera body, a lens board, means connecting the lens board with the camera body whereby the lens board is arranged to move between an operative position, wherein it is extended to its picture taking position relative to the camera body, and an inoperative position wherein the lens board is folded into the camera body, a view finder pivotally mounted on the camera body to move between an inoperative position, wherein it extends longitudinally of the camera body, and an operative position, wherein it extends at right angles to the camera body, and a connection between the view finder and the means connecting the lens board to the camera body, whereby the movement of the view finder to its operative position automatically moves the lens board to its operative position, and movement of the view finder to its inoperative position automatically moves the lens board to its inoperative position.

4. In a folding camera, the combination of a camera body, a lens board, means connecting the lens board with the camera body whereby the lens board is arranged to move between an operative position, wherein it is extended to its picture taking position relative to the camera body, and an inoperative position, wherein the lens board is folded into the camera body, a view finder pivotally mounted on the camera body to move between an inoperative position, wherein it extends longitudinally of the camera body, and an operative position, wherein it extends at right angles to the camera body, and a connection between the view finder and the means connecting the lens board to the camera body, whereby the movement of the view finder to its operative position automatically moves the lens board to its operative position, and movement of the view finder to its inoperative position automatically moves the lens board to its inoperative position, said connection between the view finder and the means connecting the lens board to the camera body being located adjacent the pivot point of the view finder.

5. In a folding camera, the combination of a camera body, a lens board, means connecting the lens board with the camera whereby the lens board is arranged to move between an operative position, wherein it is extended to its picture taking position relative to the camera body, and an inoperative position, wherein the lens board is folded into the camera body, a view finder movably mounted on the camera body to move between an operative viewing position, and an inoperative folded position, means for connecting the view finder and the means connecting the lens board to the camera body whereby movement of the view finder to its operative position automatically moves the lens board to its operative position, a releasable catch in the camera body for engaging and holding said lens board in its inoperative position, and means for releasing said catch, said means being actuated by said view finder during the first part of the movement thereof toward its operative position.

6. In a folding camera, the combination of a camera body, a lens board, means connecting the lens board with the camera body whereby the lens board is arranged to move between an operative position, wherein it is extended to its picture taking position relative to the camera body, and an inoperative position, wherein the lens board is folded into the camera body, a view finder movably mounted on the camera body to move between an operative viewing position, and an inoperative folded position, means for connecting the view finder and the means connecting the lens board to the camera body, whereby movement of the view finder to its operative position automatically moves the lens board to its operative position, a releasable catch in the camera body for engaging and holding the lens board and said view finder in their inoperative positions, and means associated with said view finder for automatically releasing said catch when the view finder is moved toward its operative position.

7. In a folding camera, the combination of a camera body, a lens board, means connecting the lens board with the camera body whereby the lens board is arranged to move between an operative position, wherein it is extended to its picture taking position relative to the camera body, and an inoperative position, wherein the lens board is folded into the camera body, a view finder movably mounted on the camera body to move between an operative viewing position, and an inoperative folded position, means for connecting the view finder and the means connecting the lens board to the camera body, whereby movement of the view finder to its operative position automatically moves the lens board to its operative position, a releasable catch located in said camera body for engaging and holding said lens board in its inoperative position, and normally held in its locking position, and means associated with said view finder for automatically momentarily moving said catch to its inoperative position to engage the lens board when the view finder is moved to its inoperative position, and for automatically releasing said catch when the view finder is moved toward its operative position.

8. In a folding camera, the combination of a camera body, a lens board, means connecting the lens board with the camera body whereby the lens board is arranged to move between an operative position, wherein it is extended to its picture taking position relative to the camera body, and an inoperative position, wherein the lens board is folded into the camera body, a view finder movably mounted on the camera body to move between an operative viewing position, and an inoperative folded position, means for connecting the view finder and the means connecting the lens board to the camera body, whereby movement of the view finder to its operative position automatically moves the lens board to its operative position, a releasable catch located in said camera body for engaging and holding said lens board in its inoperative position, and normally held in its locking position, and a cam on said view finder arranged to engage and momentarily move said catch to its inoperative position to engage the lens board when the view finder and lens board are moved to their inoperative position, and arranged to release said catch during the first part of the movement of the view finder toward its operative position, whereby the lens board is released to be moved to its operative position along with the view finder.

9. In a folding camera, the combination of a camera body having a recess in one wall thereof, a lens board, a collapsible erecting mechanism connecting said lens board to the camera body to permit the lens board to move between an extended and a folded position relative to the camera body, said erecting mechanism including a movable actuating member movement of which serves to extend or collapse said erecting mechanism depending upon the direction of said movement, a view finder movably mounted on the camera body to move between an operative viewing position, and an inoperative folded position relative thereto, and means for operatively connecting said view finder and said actuating member, whereby movement of the view finder between its operative and folded position serves to move the actuating member whereby the lens board is automatically moved between its extended and folded positions relative to the camera body.

10. In a folding camera, the combination of a camera body having a recess in one wall thereof, a lens board, a collapsible erecting mechanism connecting said lens board to the camera body to permit the lens board to move between an extended and a folded position relative to the camera body, said erecting mechanism including a movable actuating member movement of which serves to extend or collapse said erecting mechanism depending upon the direction of said movement, a view finder pivotally mounted on the camera body to move between an operative viewing position and an inoperative folded position relative thereto, and a member connected to said view finder to move therewith and adapted to engage and move said actuating member, whereby the lens board is automatically moved between its extended and folded positions automatically when the view finder is moved between its operative and folded positions respectively.

11. In a folding camera, the combination of a camera body having a recess in one wall thereof, a lens board, a collapsible erecting mechanism connecting said lens board to the camera body whereby the lens board is adapted for movement between an operative position, wherein it is extended to its picture taking position relative to the camera body, and an inoperative position, wherein it is folded into the recess in the camera body, said erecting mechanism including a movable actuating member, movement of which serves to erect or collapse said mechanism depending upon the direction of said movement, a stud extending through one wall of the camera body and being rotatable with respect to said camera body, a view finder fixed to the end of the stud extending to the outside of the camera body, and adapted to pivot between an inoperative position wherein it extends longitudinally of the camera body, and an operative posiiton wherein it is at right angles to the camera body, a member fixed to the end of the stud extending into the recess in the camera body and arranged to engage and move the actuating member of said erecting mechanism in opposite directions depending upon the direction of rotation of the stud, whereby when the view finder is moved to its operative position the actuating member is moved in a direction to extend the erecting mechanism, and when the view finder is moved to its inoperative position the actuating member is moved in the opposite direction to collapse the erecting mechanism.

12. In a folding camera the combination of a camera body, a lens board, means connecting the lens board with the camera body whereby the lens board is arranged to move between an operative position, wherein it is extended to its picture taking position relative to the camera body, and an inoperative position, wherein the lens board is folded into the camera body, a shutter carried by said lens board, a trigger mechanism associated with the shutter for tripping the same, a view finder movably mounted on the camera body to move between an operative viewing position, and an inoperative folded position, and a shutter release carried by said view finder, said shutter release adapted to be operatively connected to said trigger mechanism when the lens board and view finder are each in their operative position, and adapted to be disconnected therefrom when said view finder is moved from its operative position.

13. In a folding camera, the combination of a camera body, a lens board, means connecting the lens board with the camera body whereby the lens board is arranged to move between an operative position, wherein it is extended to its picture taking position relative to the camera body, and an inoperative position, wherein the lens board is folded into the camera body, a shutter carried by said lens board, a trigger slidably mounted on the lens board for tripping to trip said shutter, a view finder movably mounted on the camera body to move between an operative viewing position, and an inoperative folded position, and a shutter release movably mounted on said view finder, and adapted to be operatively connected to said trigger when the lens board and view finder are each in their operative positions, and adapted to be disconnected therefrom when said view finder is moved from its operative position.

14. In a folding camera, the combination of a camera body, a lens board, a collapsible erecting mechanism connecting said lens board to the camera body to permit the lens board to move between an extended and a folded position relative to said camera body, a view finder movably mounted on the camera body to move between an operative viewing position and an inoperative folded position relative thereto, means for connecting the view finder and the erecting mechanism whereby movement of the view finder to its operative position automatically extends the erecting mechanism, a shutter carried by said lens board, a trigger mechanism associated with said shutter for tripping the same, and a shutter release mechanism carried by said view finder, and adapted to be operatively connected to said trigger mechanism when the lens board and view finder are each in their operative position, whereby the trigger mechanism can be operated by actuation of the shutter release mechanism.

15. In a folding camera the combination of a camera body, a lens board, means connecting the lens board with the camera body whereby the lens board is arranged to move between an operative position, wherein it is extended to its picture taking position relative to the camera body, and an inoperative position, wherein the lens board is folded into the camera body, a shutter carried by said lens board, a trigger mechanism associated with the shutter for tripping the same, a view finder movably mounted on the camera body to move between an operative viewing position, and an inoperative folded position, said view finder including a recess, a shutter release pivotally mounted in said recess to move between a first position, wherein it is within the confines of the view finder, and a second position, wherein it extends outside the confines of the view finder, means normally forcing said release to said second position, said release arranged so that it is adapted to be connected to the trigger mechanism when the lens board and view finder are in their operative positions, whereby the shutter can be tripped by movement of said release from said second position to said first position, and means for automatically moving said release to said first position when the view finder is moved to its folded position.

16. In a folding camera, the combination of a camera body, a lens board, means connecting the lens board with the camera body whereby the lens board is arranged to move between an operative position, wherein it is extended to its picture taking position relative to the camera body, and an inoperative position, wherein the lens board is folded into the camera body, a shutter carried by said lens board, a trigger mechanism associated with the shutter for tripping the same, a view finder, including an elongated base member having a recess in one side, pivoted to one side wall of the camera body to move between an operative viewing position and an inoperative folded position relative to the side wall of the camera body, a shutter release lever pivoted in said recess in said base member to move between an extended position wherein one end thereon extends outside the confines of the base member, and a folded position wherein the lever is substantially within the confines of the base member, means normally holding said release lever in said extended position, said release lever arranged to be operatively connected with the shutter trigger mechanism when the view finder and lens board are in their operative position, whereby movement of the release lever from said extended position to said folded position serves to trip the shutter, and a projection on the release lever arranged to engage a cutout in the side wall of the camera body when the view finder is moved to its inoperative position, whereby the release lever is moved to said folded position within the confines of the base member of the view finder.

17. In a folding camera, the combination of a camera body, a lens board, means connecting the lens board with the camera body whereby the lens board is arranged to move between an operative position, wherein it is extended to its picture taking position relative to the camera body, and an inoperative position, wherein the lens board is folded into the camera body, a shutter carried by the lens board, a trigger associated with said shutter for tripping the same, a view finder movably mounted on the camera body to move between an operative viewing position, and an inoperative folded position relative thereto, means for connecting the view finder and the means connecting the lens board to the camera body, whereby movement of the view finder to its operative position automatically moves the lens board to its operative position, a releasable catch in the camera body for engaging and holding said lens board and view finder in their inoperative positions, means for releasing said catch during the first part of the movement of the view finder toward its operative position, and a shutter release movably mounted on the view finder, whereby it is adapted to be operatively connected with said trigger when the view finder and lens board are moved to their operative positions, said shutter release being pivotally mounted on said view finder to move between extended and folded positions relative thereto, and means for automatically moving said shutter release to its folded position when the view finder is moved to its inoperative position.

18. In a folding camera the combination with a camera body, a lens board, a collapsible erecting mechanism connecting said lens board to the camera body to permit the lens board to be moved between an operative extended and an inoperative folded position relative thereto, a shutter carried by said lens board, a trigger mechanism carried by the lens board and associated with said shutter for tripping the same, a view finder pivotally mounted on the camera body to move between an operative and an inoperative position, means connecting the view finder to the erecting mechanism whereby movement of the view finder to its operative position automatically extends said erecting mechanism and along with it the lens board, said view finder including an elongated base member, a front finder element pivotally mounted on one end of said base member to move between a folded position, wherein it lies in a plane parallel to the base member, and a viewing position, wherein it extends perpendicularly of the base member and overhangs the lens board adjacent said trigger mechanism, and a shutter release mechanism carried by said base member to be operatively connected with the trigger mechanism when the view finder and lens board are in their respective operative positions, said shutter release mechanism comprising a yoke slidably mounted on the front finder element and arranged to engage the trigger mechanism when the front finder element is in its viewing position, and a release lever pivotally mounted on said base member and arranged to engage the yoke member whereby movement of the lever serves to slide the yoke member and actuate the trigger mechanism.

19. In a folding camera the combination of a camera body, a lens board, a collapsible erecting mechanism connecting the lens board to the camera body whereby the lens board can move between an extended and a folded position relative to said camera body, a view-finder movably mounted on said camera body to move between an operative and an inoperative position relative thereto, a releasable latch on said camera body adapted to positively lock the lens board in its folded position and frictionally hold said view finder in its inoperative position, and means for automatically releasing said latch when the view finder is moved from its inoperative position toward its viewing position.

JOHN CHRISTIE.